United States Patent [19]

Samuelson

[11] Patent Number: 5,533,265
[45] Date of Patent: Jul. 9, 1996

[54] DEVICE FOR PIERCING A NUT

[76] Inventor: Shel L. Samuelson, 14 Lookout Dr., Ledgewood, N.J. 07852

[21] Appl. No.: 489,050

[22] Filed: Jun. 9, 1995

[51] Int. Cl.[6] .................................................. A47J 43/26
[52] U.S. Cl. ........................... 30/120.2; 30/120.1
[58] Field of Search ................................ 30/120.2, 120.1, 30/120.5, 120.3, 120.4, 368, 113, 286, 295, 151, 162, 335

[56] References Cited

U.S. PATENT DOCUMENTS

| | | | |
|---|---|---|---|
| 1,710,629 | 4/1929 | Lindsey . | |
| 2,426,120 | 8/1947 | Posey | 146/16 |
| 2,490,615 | 12/1949 | Bloomfield | 146/13 |
| 2,700,994 | 2/1955 | Welfel | 146/13 |
| 2,730,800 | 1/1956 | Bailey | 30/2 |
| 2,804,111 | 8/1957 | Burchett | 146/13 |
| 3,048,208 | 8/1962 | Umanoff | 146/13 |
| 3,924,326 | 12/1975 | Di Gaetano | 30/120.2 |
| 4,200,482 | 4/1980 | Scholz | 99/582 |
| 4,550,495 | 11/1985 | Fornes | 30/120.3 |
| 4,554,736 | 11/1985 | Rodriguez | 30/120.3 |
| 4,768,693 | 9/1988 | Tomaszewski | 225/94 |
| 5,052,107 | 10/1991 | Hirzel | 30/120.3 |
| 5,174,026 | 12/1992 | Writt | 30/120.2 |
| 5,361,688 | 11/1994 | Blankenship | 99/572 |

FOREIGN PATENT DOCUMENTS

| | | | |
|---|---|---|---|
| 232827 | 2/1961 | Australia . | |
| 975797 | 3/1951 | France . | |
| 180503 | 1/1906 | Germany | 30/120.1 |
| 3139052 | 4/1983 | Germany . | |
| 296886 | 12/1929 | Italy | 30/151 |
| 19608 | 7/1897 | United Kingdom . | |

*Primary Examiner*—Douglas D. Watts
*Attorney, Agent, or Firm*—Thomas L. Adams

[57] ABSTRACT

A device for piercing a nut has a cup-shaped member with a manually engageable, convex surface and a concave underside. A cutter is mounted on the concave underside of the member and points along a thrust direction. A retractable element is mounted adjacent to the cutter to reciprocate along the thrust direction. This retractable element can retract relative to the member to expose and give the cutter clearance for piercing the nut. The device is used by placing the retractable element over the nut with the cup-shaped member over the element. Then the cup-shaped member is thrust down to pierce the nut with the cutter. When the cup-shaped member is released, the retractable element moves relative to the cup-shaped member to push the nut off the cutter.

40 Claims, 8 Drawing Sheets

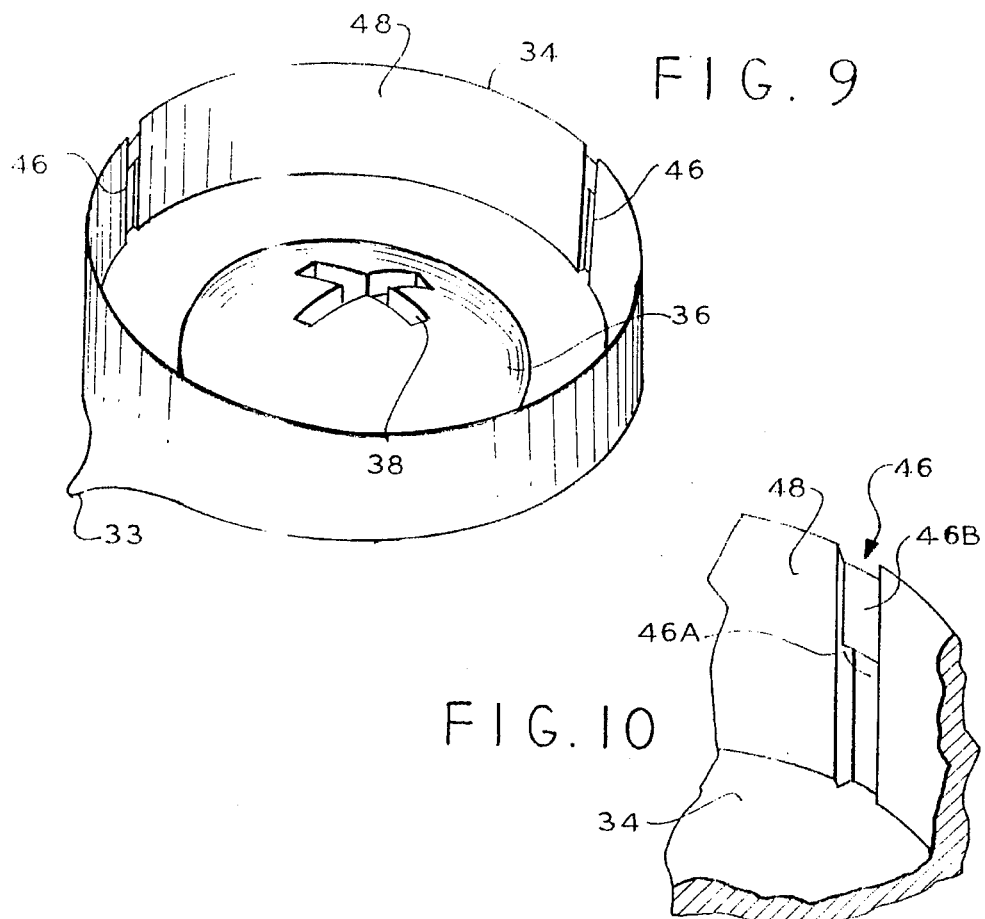
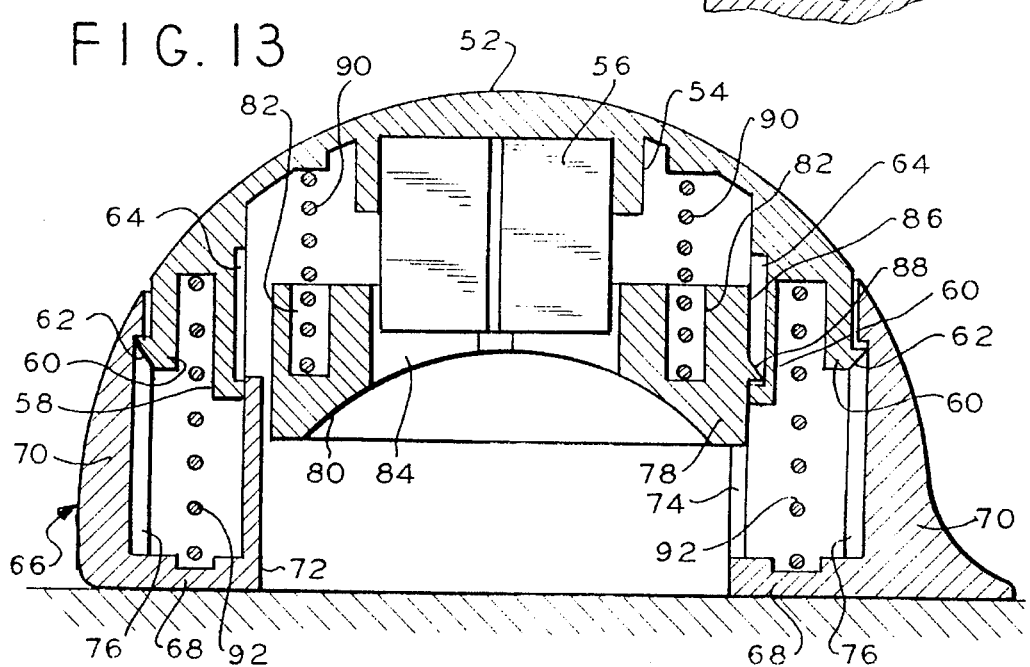

DEVICE FOR PIERCING A NUT

BACKGROUND OF THE INVENTION

1. Field of the Invention

The present invention relates to devices for piercing a nut, and in particular, to devices having a manually operable cutter.

2. Description of Related Art

Before roasting certain nuts, such as chestnuts, the shell should be pierced to allow the escape of steam and to allow the meat of the nut to expand. Unless pierced, the nut has a tendency to explode, scattering and damaging the nut.

With this problem in mind, U.S. Pat. No. 2,700,994 proposed a plier-like device for piercing a chestnut. One jaw of the device had crossed triangular blades arranged like a pyramid. A disadvantage with this device is that the chestnut tends to remain impaled on the blades, requiring manual removal. Also a plier-like device has the disadvantage that one hand must be dedicated to holding the pliers when repetitively piercing chestnuts. Thus, if two hands are needed during this procedure, the pliers must be laid aside and later fetched and reoriented before using. Furthermore, plier-like devices can be difficult to manipulate open and can demand much manual dexterity. In addition, such devices leave the piercing blades exposed, which presents a risk of personal injury.

Also, such devices lack a mechanism to hold the nut in place prior to the piercing operation. Also, such devices have no mechanism for limiting the depth of penetration of the blade, and can bore from one side of the nut to the other. To avoid excessive penetration the user must develop the judgement and feel for squeezing the plier-like device an appropriate amount for a particular size nut. Clearly, the difficulty in controlling such variability reduces the efficiency of these devices.

U.S. Pat. No. 5,052,107 shows a hinged device with two opposing jaws. One jaw is annular for holding a chestnut, and the other jaw holds a blade to slit the chestnut. This device has similar disadvantages.

Other plier-like devices are known for opening a nut (as opposed to slitting). For example Australian Specification 232,827 shows a plier-like device having on one jaw a cup for holding a nut while the opposing jaw has a pointed and lobed device for cracking open the nut. Similarly, U.S. Pat. No. 3,048,208 shows another plier-like device in which one jaw has a recess and the opposing jaw a pair of crossed blades for cracking open a walnut. See also U.S. Pat. Nos. 1,710,629; 2,490,615; 2,804,111; 4,550,495; and 5,361,688, and DE-OS 3139052; FR 975,797; and UK 19,608.

Various tabletop devices are also known for cracking a nut. These have the advantage of being a unit that remains ready and lessens the need for the more complicated manipulations demanded by pliers. These known devices, however, are unconcerned with piercing a chestnut and do not suggest apparatus appropriate for such piercing. See U.S. Pat. Nos. 2,426,120; 4,200,042; 4,554,736; and 5,174,026.

In U.S. Pat. No. 3,924,326 a chestnut is prepared for roasting by slicing a segment from the nut as opposed to piercing the nut in the usual fashion.

U.S. Pat. No. 4,768,693 shows a table top, canister opener having four piercing blades and a shielding plate to prevent canister chards from flying about. This reference is unconcerned with piercing nuts.

Accordingly, there is a need for a convenient device for piercing a nut and that has one or more advantages, such as: automatically removal of the nut from the cutting blade, regulated penetration depth, protection from accidental cutting, or reduced manipulation during operation.

Applicant filed May 4, 1995, a related application for a device for piercing a nut on May 4, 1995 as U.S. Ser. No. 08/434,569. The disclosure of that application is incorporated herein by reference.

SUMMARY OF THE INVENTION

In accordance with the illustrative embodiment demonstrating features and advantages of the present invention, there is provided a device for piercing a nut. The device has a cup-shaped member with a manually engageable, convex surface and a concave underside. Also included is a cutter mounted on the concave underside of the member and pointing along a thrust direction. The device also has a retractable element mounted adjacent to the cutter to reciprocate along the thrust direction. This retractable element is operable to retract relative to the member to expose and give the cutter clearance for piercing the nut.

According to another aspect of the invention a method can pierce a nut with a cup-shaped member containing a cutter and a retractable element. The method include the step of placing the retractable element over the nut with the cup-shaped member over the element. Another step is thrusting the cup-shaped member down to pierce the nut with the cutter. Another step of the method is releasing the cup-shaped member and moving the retractable element relative to the cup-shaped member to push the nut off the cutter.

By employing such a method or device, a relatively simply effective, and efficient technique is achieved for piercing nuts, such as chestnuts. In a preferred embodiment, a hand held, cup-shaped member contains a coaxial cutting blade and a disk, which disk is spring loaded to retractably sheath the cutter blade. The disk is placed over the chestnut before depressing the cup shaped member, to unsheath the cutter from the disk and pierce the chestnut. In some embodiments the retractable disk is positioned and shaped to rest atop the nut without touching the working surface supporting the nut.

In alternative embodiments, the retractable element rests on the working surface while its central dome section is large enough to arch over the nut. In this embodiment, the cup-shaped member is a plunger-like device that slides telescopically inside the retractable element.

In still other embodiments, the cup-shaped member can be made in the form of a plunger that is slidably mounted to move telescopically within an annular skirt. Thus, the plunger can move vertically while the annular skirt rests atop the working surface supporting the nut. In this embodiment, the annular skirt is spring loaded within the plunger. The skirt can sheath 20 and unsheath the blade and eject a nut from a cutter after piercing.

BRIEF DESCRIPTION OF THE DRAWING

The above brief description as well as other objects, features, and advantages of the present invention will be more fully appreciated by reference to the following detailed description, when taken in conjunction with the accompanying drawing, wherein:

FIG. 9 is an upper axonometric view of the retractable element of FIG. 1;

FIG. 10 is a detailed view of a groove in the element in FIG. 9;

FIG. 13 is an axial sectional view of a device that is an alternate to that of FIG. 1;

DETAILED DESCRIPTION OF PREFERRED EMBODIMENTS

Figure 1:
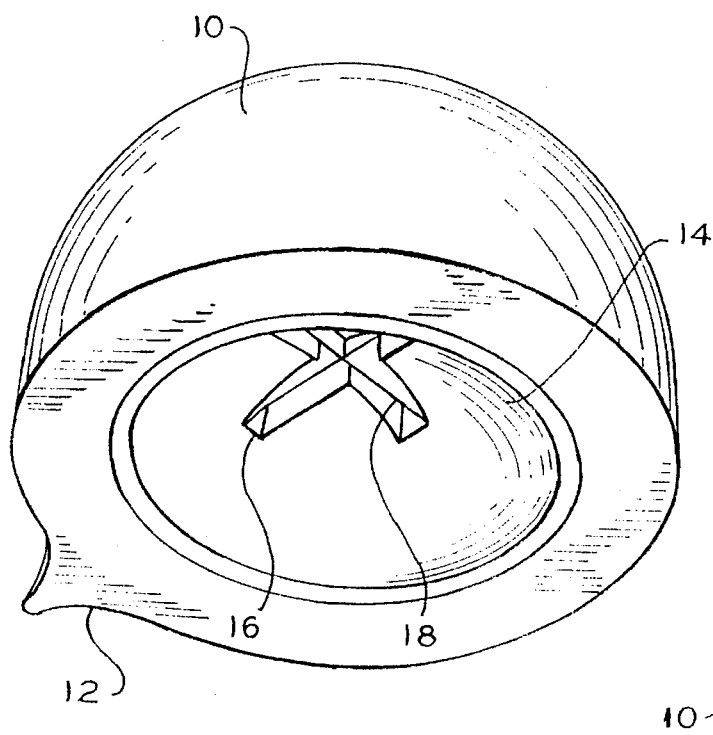
FIG. 1 is a lower axonometric view of a device in accordance with the principles of the present invention.

Referring to FIGS. 1, the illustrated device is shown as a cup-shaped member 10 having a generally hemispherical shape and a flat, annular underside, with a round rim carrying a pointed stub 12. Stub 12 can be used as a visual guide for consistently orienting the device and also has a visual appeal in that the shape is reminiscent of the shape of a chestnut. Mounted in member 10 is a retractable element 14 (illustrated further hereinafter). Element 14 is shown with a bowl-shaped underside (also referred to as an engagement surface) and a cruciform channel 16. A cutter 18 is visible inside the cruciform channel 16.

Figure 3:
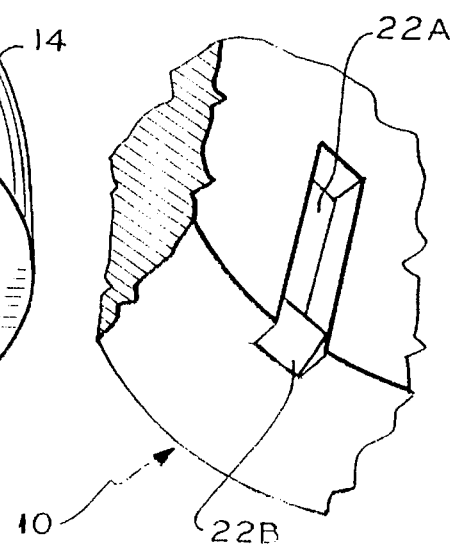
FIG. 3 is a detailed view of a groove in the cup-shaped member of FIG. 2.
Figure 2:
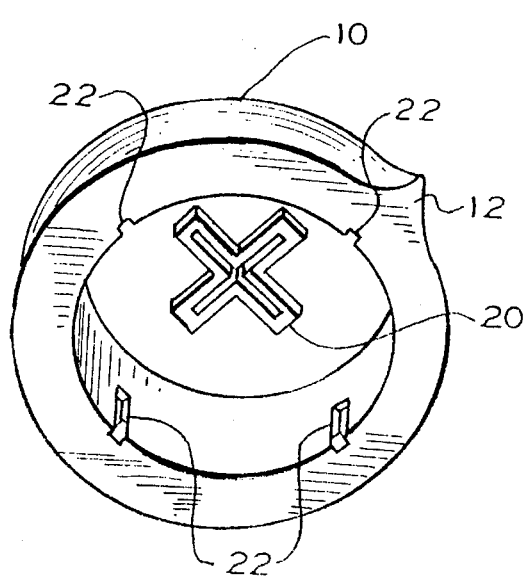
FIG. 2 is a lower axonometric view of the cup-shaped member of the device of FIG. 1.

Referring to FIGS. 2 and 3, the concave underside of cup shaped member 10 is shown embossed with a cruciform socket 20, designed to hold a pair of crossed cutters (illustrated further hereinafter). The internal wall bordering socket 20 contains four internal grooves 22. Each of the grooves 22 has a main groove section 22A, bordered by a graded slot 22B, shown in the form of a rampway. This rampway 22B enables a subsequently illustrated tongue to slide into the main section 22A of the groove.

Figure 4:
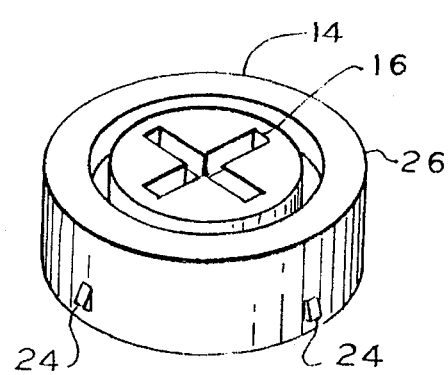
FIG. 4 is an upper axonometric view of the retractable element of the device of FIG. 1.

Referring to FIG. 4, two of the four tongues 24 are illustrated herein as wedges in the form of triangular prisms mounted at four equiangularly spaced positions on the cylindrical periphery of retractable element 14. The wedges 24 act as a ramp to allow the retractable element to snap into the previously illustrated grooves (grooves 22 of FIG. 2).

An annular groove 26 encircles the cruciform channel 16 and acts as a receptacle for a spring to be illustrated hereinafter.

Figure 5:
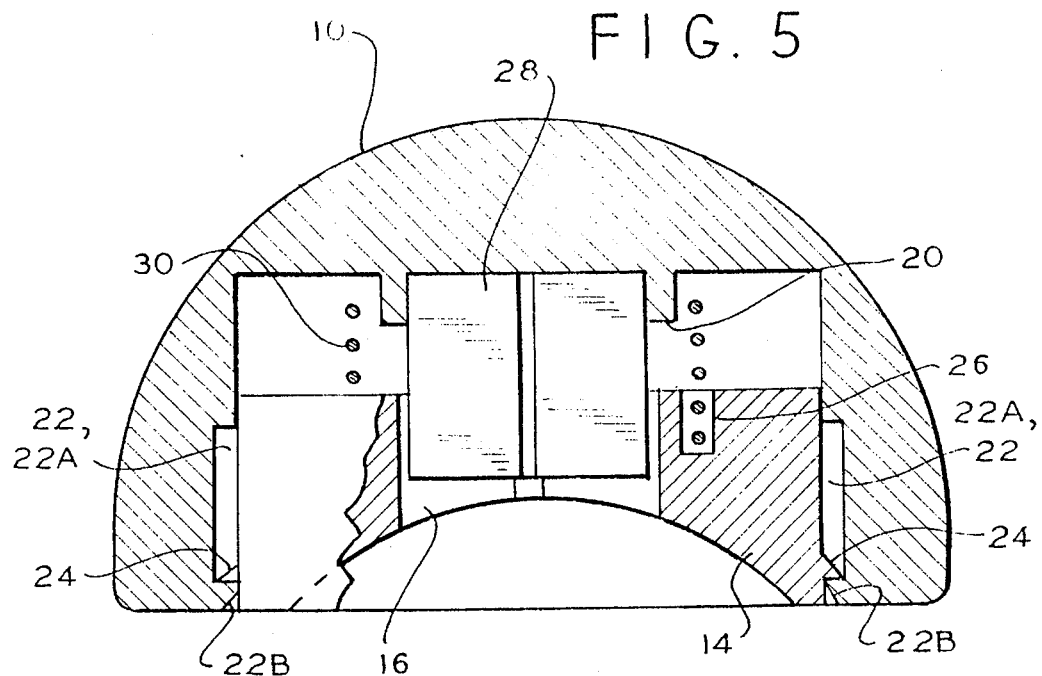
FIG. 5 is an axial sectional view of the device of FIG. 1.

Referring to FIG. 5, the previously illustrated, cup-shaped member 10 contains the retractable element 14, shown with its tongues 24 slidably mounted in position at the bottom of internal grooves 22A. The joint between tongue 24 and groove 22A is herein referred to as a tongue and groove joint. Cutter 28 is shown herein as a pair of crossed blades mounted in the cruciform socket 20. Cutter 28 may be formed from sheet steel stampings that are linked to make a crossed form. The projecting lower edges of cutter 28 are sharpened for the purpose of cutting nuts, as described presently. Cutter 28 is shown partially occupying the cruciform channel 16 formed in retractable element 14.

A resilient means is shown herein as spiral spring 30. Spring 30 is mounted between the concave underside of cup-shaped member 10 and the annular groove 26 in retractable element 14. Constructed in this fashion, retractable element 14 can reciprocate coaxially within member 10. Spring 30, however, urges the element 14 outwardly in a direction herein referred to as the thrust direction.

Figure 6:
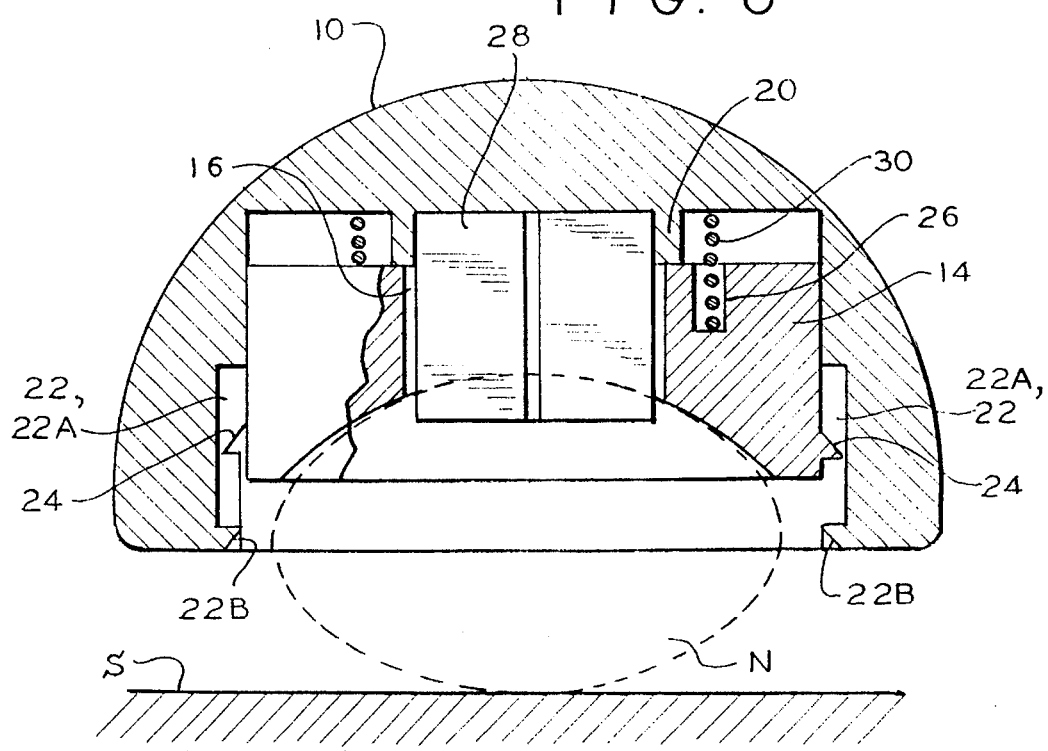
FIG. 6 is an axial sectional view of the device of FIG. 5, now shown piercing a nut.

In operation, the device of FIG. 6 is placed over a nut N with the retractable element 14 resting atop nut N. Thereafter, cup-shaped member 10 is manually depressed, causing cutter 28 to pierce nut N as illustrated. The descent of cutter 28 is limited when cruciform socket 20 abuts the top of retractable element 14. Since the elevation of retractable element 14 is limited by engagement atop nut N, the descent of member 10 is likewise limited. As cutter 28 penetrates nut N, element 14 progressively retracts to unsheath cutter 28, as wedge 24 slides up groove 22 as illustrated.

In this embodiment, the maximum depth of penetration is as illustrated in FIG. 6. This penetration depth will always be achieved, except for smaller nuts, wherein the depth of penetration will be limited by the minimum distance between the lowermost edge of cutter 28 and the lowermost portion of member 10. For nuts having a height just slightly greater than this distance, the penetration will be only slight.

Figure 7:
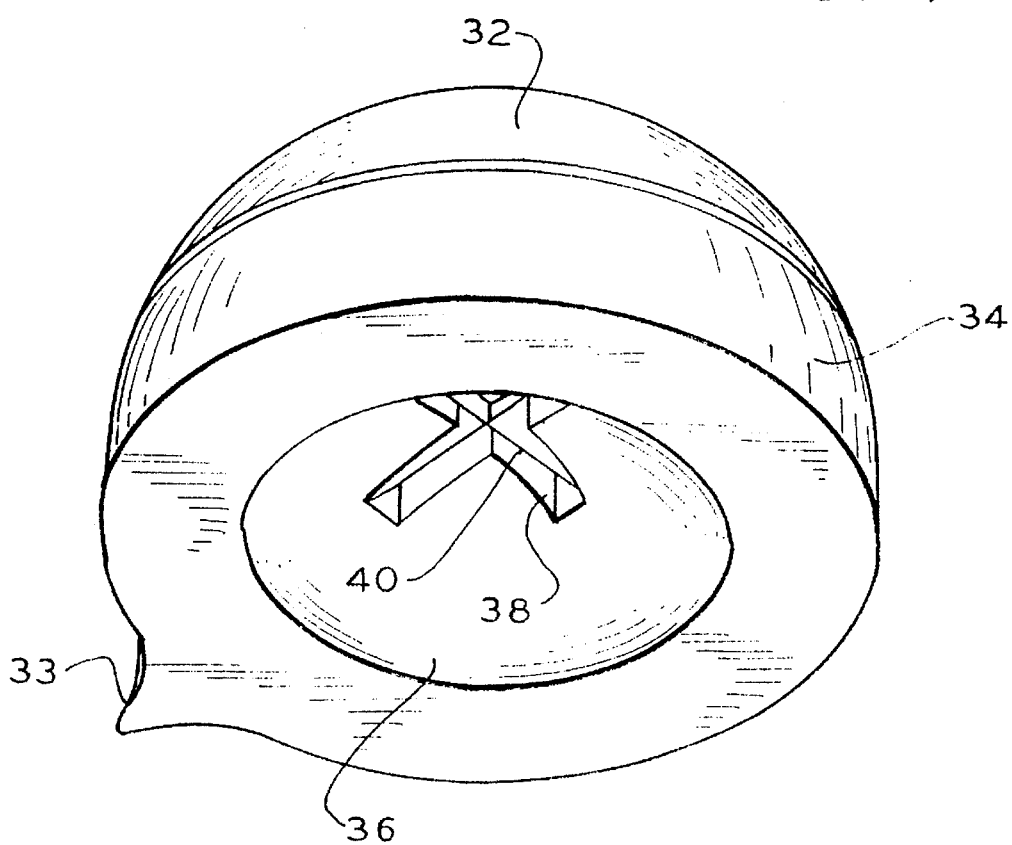
FIG. 7 is a lower axonometric view of a device that is an alternate to that of FIG. 1.

Referring to FIG. 7, an alternate device is illustrated having a cup-shaped member 32 slidably mounted inside a retractable element 34. The underside of element 34 is shown with a domed partition 36 perforated by a cruciform channel 38. A cutter 40 is partially visible in channel 38. The external surface of partition 36 is referred to as an engagement surface.

Figure 8:
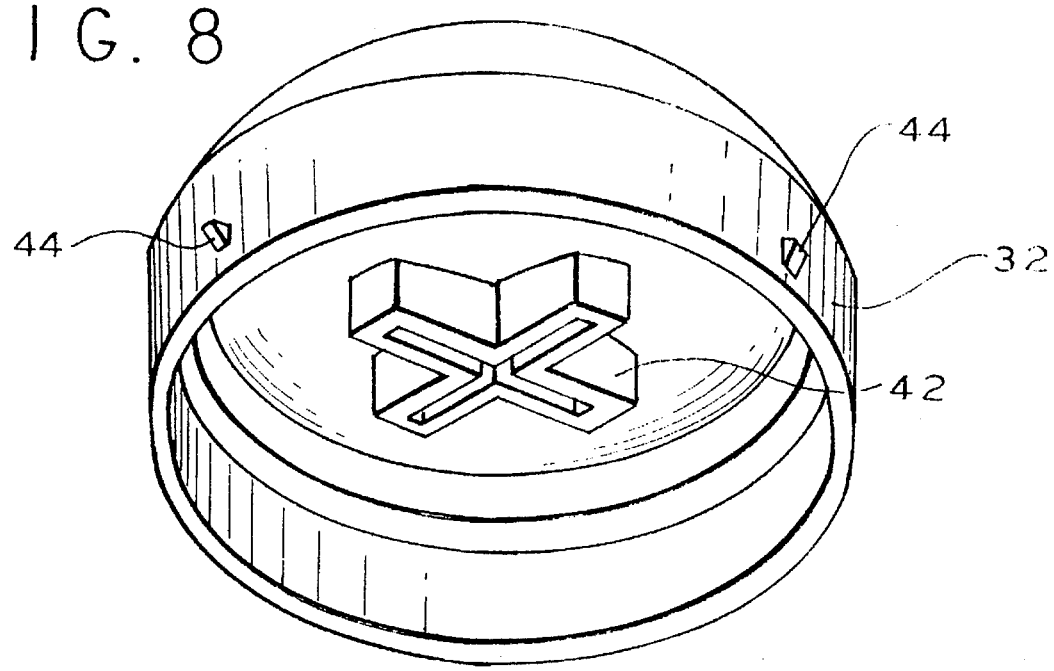
FIG. 8 is an axonometric view of the underside of the plunger of the device of FIG. 7.

Referring to FIG. 8, the concave underside of cup-shaped member 32 is shown embossed with a cruciform socket 42, designed to hold the previously mentioned cutter (cutter 40 of FIG. 7). Two of the four equiangularly spaced wedges 44 (also referred to as tongues) are shown mounted on the cylindrical periphery of cup-shaped member 32. These wedges 44 engage subsequently illustrated grooves in the retractable element.

Referring to FIGS. 9 and 10, internal grooves 46 are shown for accepting the previously mentioned wedges (wedges 44 of FIG. 8). Internal grooves 46 are shown having a shallow section 46B bordering a deeper section 46A. Shallow section 46B provides a transition for facilitating assembly so that the previously mentioned wedges can be guided over the shallow portion 46B into the deeper portion 46A of groove 46.

Retractable element 34 is shown with an annular wall 48 joined to a floor featuring previously mentioned domed partition 36, shown here perforated by cruciform channel 38. Visible in FIG. 9 is the fact that the base of retractable element 34 has a round rim with a pointed stub 33.

Figure 11:
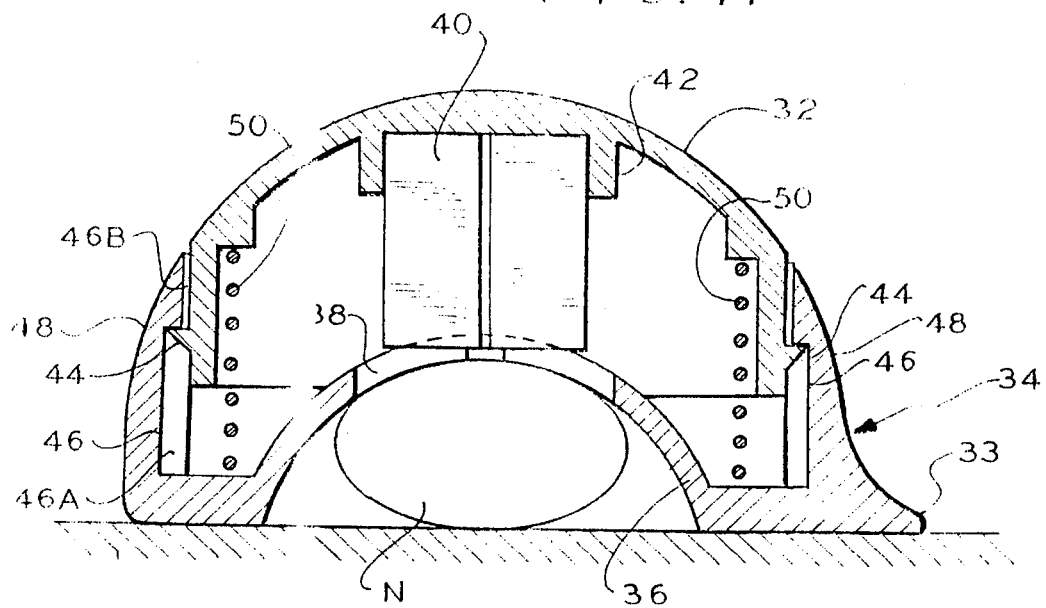
FIG. 11 is an axial sectional view of the device of FIG. 1 poised over a relatively large nut.
Figure 12:
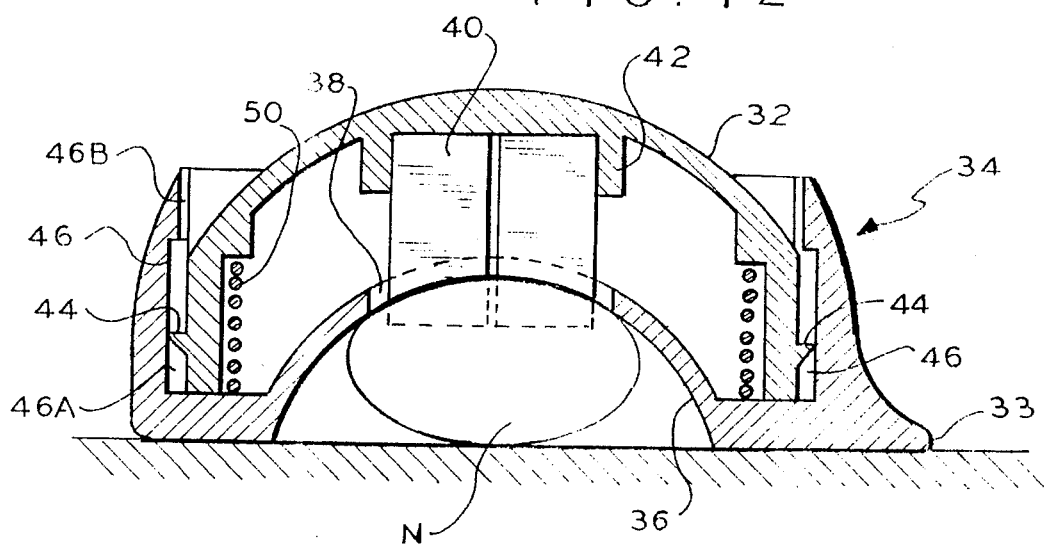
FIG. 12 is an axial sectional view of the device in FIG. 11 piercing a relatively small nut.

Referring to FIGS. 11 and 12, previously illustrated cup-shaped member 32 is shown slidably mounted within annular walls 48 of retractable element 34. Wedges 44 are shown sliding within the internal grooves 46 to form a tongue and groove joint. Accordingly, cup-shaped member 32 can coaxially slide within the retractable element 34 in a thrust direction.

A resilient means is shown herein as a spiral spring 50. Spring 50 is mounted between the concave underside of member 32 and the internal floor of retractable element 34, around domed partition 36.

In operation, the device of FIGS. 11 and 12 is placed over a nut N as illustrated in FIG. 11. The nut N is sized to fit under the domed portion 36 of element 34 with both element 34 and the nut both resting on the same work surface. For larger nuts, the device will be elevated above the work surface. On the other hand, smaller nuts will leave clearance between the underside of partition 36 and the nut.

When the user depresses member 32, cutter 40 extends through the channel 38 in domed partition 36. The extension of cutter 40 continues until the bottom of member 32 abuts the internal floor of element 34, as shown in FIG. 12. Accordingly, the amount of extension of cutter 40 will be uniform. For small nuts, part of the upper portions of the exposed blade will not affect the nut. However, for nuts as large as shown in FIG. 12 or larger, the depth of penetration will be the constant amount illustrated there.

When the user releases member 32, spring 50 lifts member 32 and retracts cutter 40. Consequently, the cutter 40 is pulled out of nut N.

Referring to FIGS. 13–16, a third alternative device is shown, again with a cup-shaped member 52 (also referred to as a plunger) having on its concave underside a cruciform socket 54 for holding a pair of crossed blades 56 that operate as a cutter. Member 52 is shown having an inside annular partition 58 and a shorter, outside coaxial annular partition 60 (both partitions being generally cylindrical). Tongues or wedges 62 (only two of the four are visible in each view) are shown in the form of triangular prisms embossed at four equiangular positions along the cylindrical periphery of outside annular partition 60. Similarly grooves 64 (two of four visible) are shown mortised at four equiangularly spaced positions on the cylindrical interior of inside partition 58.

Figure 14:
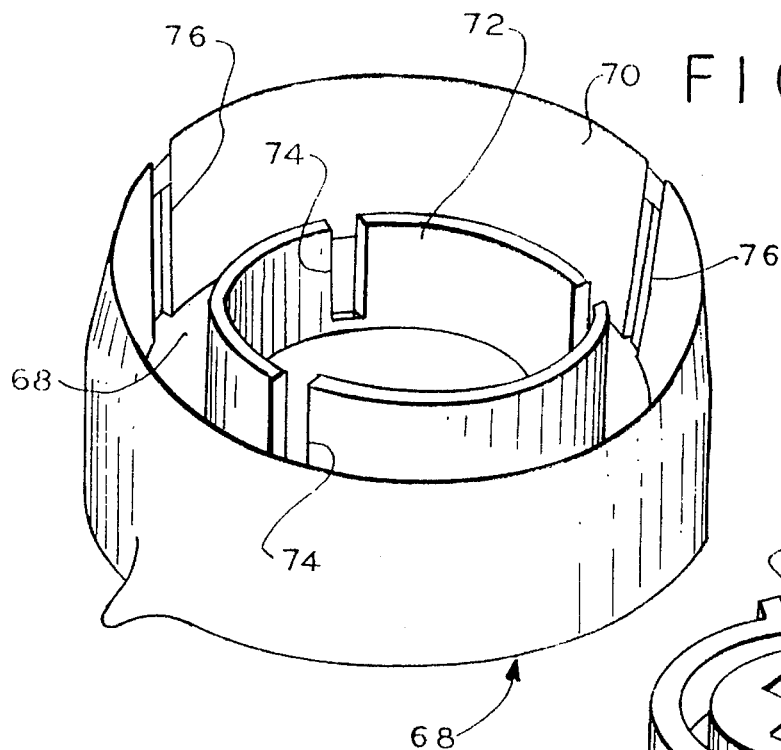
FIG. 14 is an upper axonometric view of the annular skirt of the device of FIG. 13.

Referring to FIGS. 13 and 14, an annular skirt 66 is shown in the form of an annular channel having a floor 68 bordered by an outside annular wall 70 and an inside annular wall 72. Wall 72 is shown breached by three equiangularly spaced notches 74. Outside wall 70 has a trio of equiangular spaced grooves 76 (similar in shape to groove 46 of FIG. 10).

Figure 15:
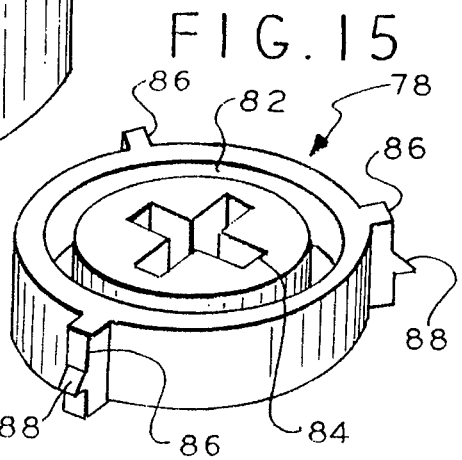
FIG. 15 is an upper axonometric view of the retractable element in the device in FIG. 13.
Figure 16:
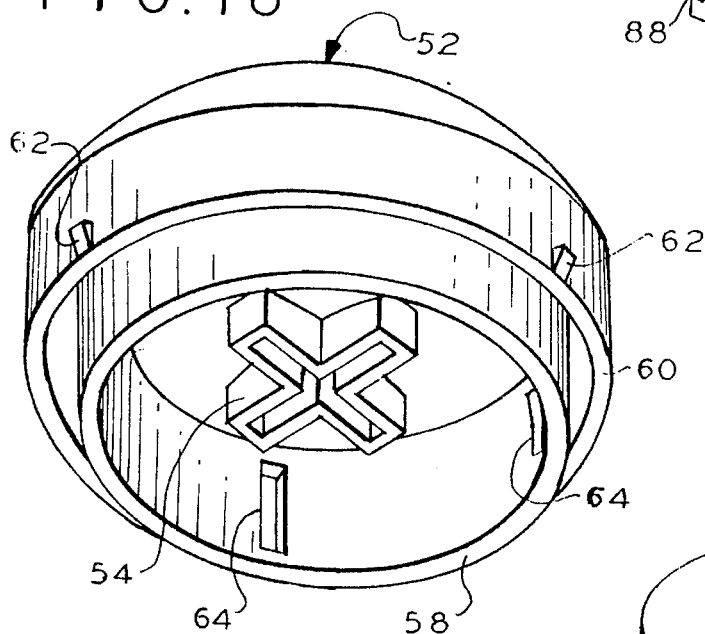
FIG. 16 is an axonometric view of the underside of the plunger in the device of FIG. 13.

Referring to FIGS. 13, 14 and 15, retractable element 78 is shown as a disc-like member with a bowled underside 80 (also referred to as an engagement surface) and an upper surface having an annular groove 82. Retractable member 78 is perforated by a cruciform channel 84. A trio of splines 86 radially project from three equiangularly spaced positions on the cylindrical periphery of element 78. Splines 86 are mostly rectangular, but each has a single wedge 88 which is part of a tongue and groove joint.

Specifically, wedge 88 is slidably mounted in groove 64 mortised inside annular partition 58 of plunger 52. Plunger 52 is coaxially mounted to telescopically slide within the skirt 66. The wedges 62 are slidably mounted in the internal grooves 76 on the walls 70 of skirt 66. The joints between wedge 62 and groove 76 and between wedge 88 and groove 46 are referred to as tongue and groove joints.

A resilient means is shown herein as spiral spring 90. Spring 90 is mounted between the concave underside of plunger 52 and the annular groove 82 in retractable element 78. Spring 90 therefore tends to urge element 78 outwardly in a thrust direction.

An extension means is shown herein as spiral spring 92. Spring 92 is mounted between floor 68 of skirt 66 and the underside of plunger 52, specifically, between walls 58 and 60.

Figure 17:
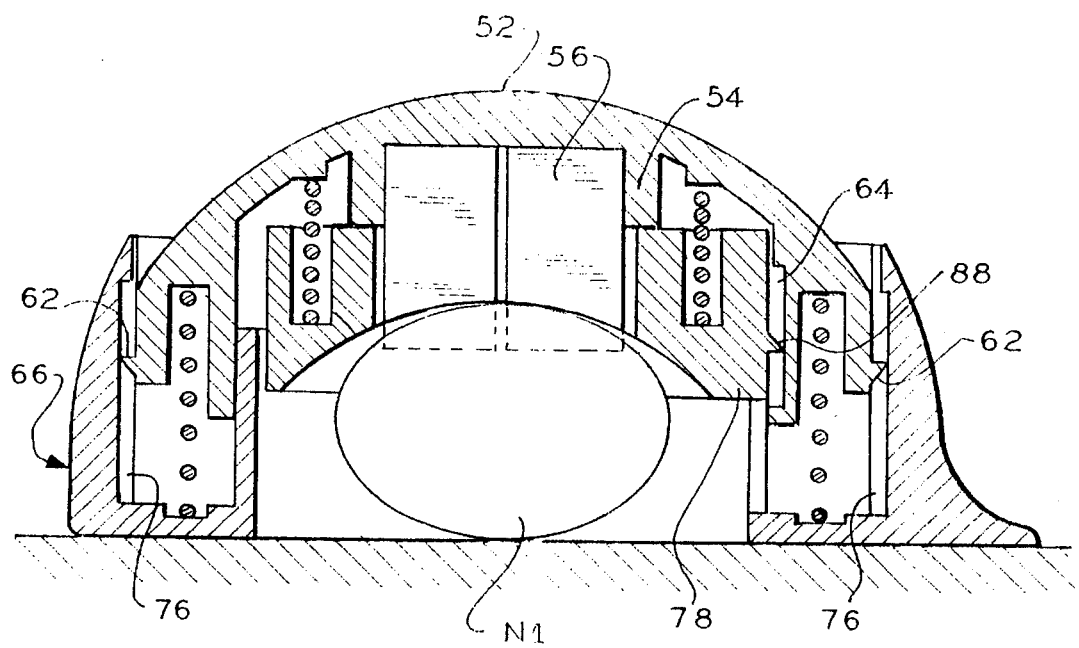
FIG. 17 is an axial sectional view of the device of FIG. 13, but shown piercing a relatively large nut.

In operation, the device may work with a relatively large nut N1 as shown in FIG. 17. Accordingly, the device is placed over nut N1 as illustrated with the retractable element 78 over nut N1 and skirt 66 encircling nut N1. Next, the user manually depresses the upper convex surface of plunger 52 causing cutter 56 to extend past retractable element 78. Thus unsheathed, cutter 56 pierces nut N1 as illustrated. As shown, the plunger 52 rides down through skirt 66 so that wedge 62 travels less than half way through groove 76.

The retractable element 78, however, retracts fully and abuts the cruciform socket 54. Thus, cutter 56 can extend beyond retractable element 78 only a limited amount.

After manual pressure is released from plunger 52, the device returns to the condition illustrated in FIG. 13. Significantly, the retractable element 78, again sheaths cutter 56 to push nut N1 off cutter 56.

Figure 18:
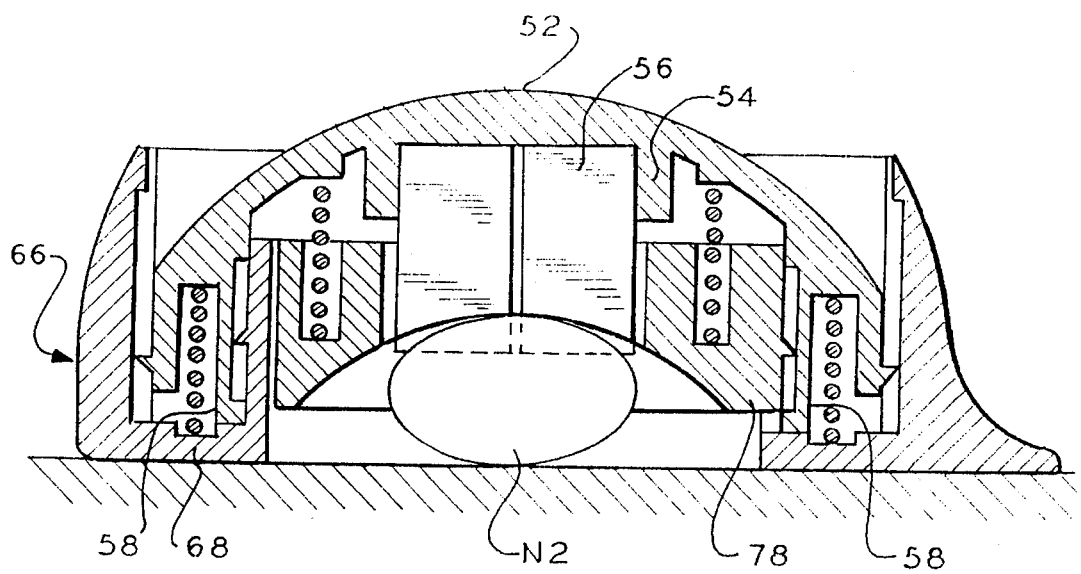
FIG. 18 is an axial sectional view of the device of FIG. 17, now shown piercing a relatively small nut.

Referring to FIG. 18, a relatively small nut N2 is shown pierced by cutter 56. In this arrangement, the retractable element 78 does not abut cruciform socket 54. Thus, cutter 56 is unsheathed to a limited extent and pierces nut N2 to a lesser extent. Thus unlike the operation of FIG. 17, the downward motion of plunger 52 is not restrained by plunger 52 abutting the retractable element 78. Instead, inside wall 58 of plunger 52 abuts floor 68 of skirt 66 to limit the depth of penetration of cutter 56 into nut N2.

Figure 20:
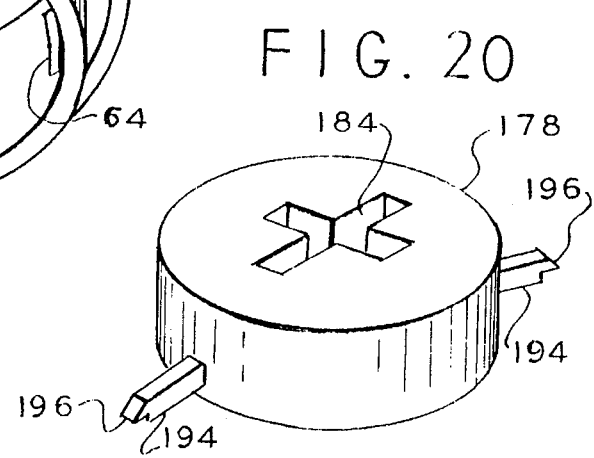
FIG. 20 is an upper axonometric view of the retractable element of the device of FIG. 19.
Figure 19:
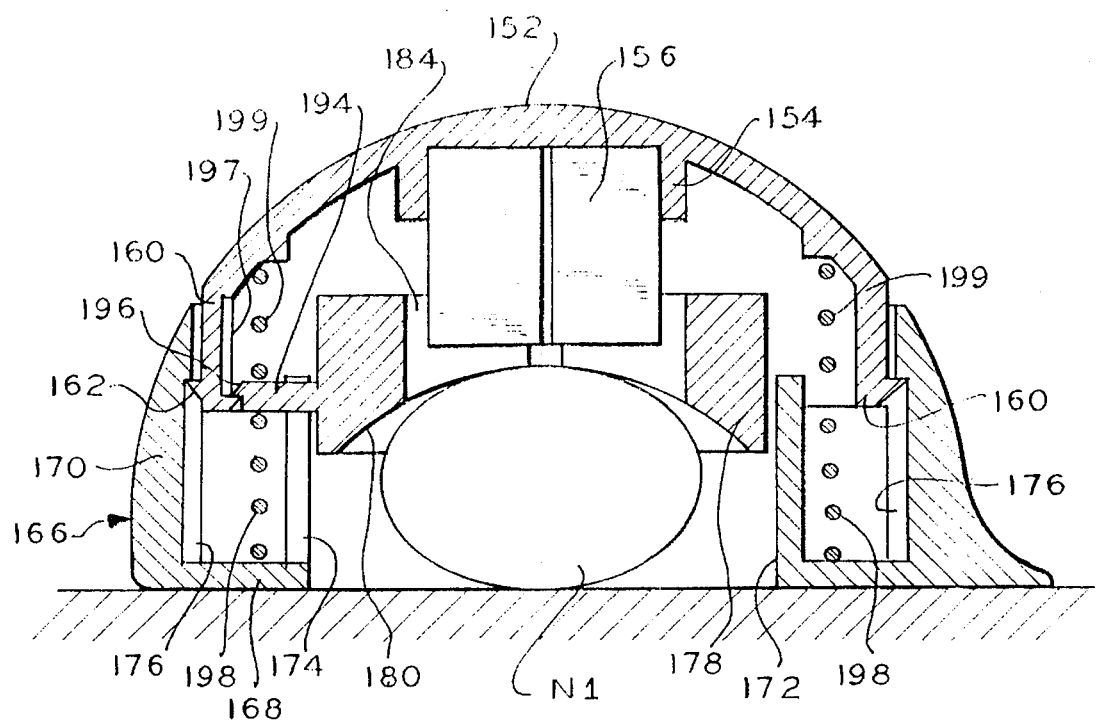
FIG. 19 is an axial sectional view of a device that is an alternate to that of FIG. 1 and is shown over a relatively large nut.

Referring to FIGS. 19 and 20, a fourth alternative device is shown having many functional and structural similarities to the device of FIG. 13. Accordingly, similar components have the same reference numeral but incremented by 100. Thus, plunger 152 is telescopically and slidably mounted within skirt 166. The outside wall 160 has a wedge 162 slidably mounted in the internal groove 176 on outside annular wall 170. Skirt 166 is again a channel-like structure having a floor 168, an inside wall 172 and an outside wall 170.

Retractable element 178 is configured and mounted differently and uses a different spring combination. Specifically, the splines previously illustrated in FIG. 15 are replaced by a trio of spokes 194, equiangularly spaced along the outside periphery of element 178. Spokes 194 terminate in wedge-like projections 196. Wedges 196 are shown in FIG. 19 slidably mounted in a groove 197 formed on the inside of wall 160 of plunger 152.

As before, the inside annular wall 172 of skirt 166 has a trio of notches 174, sized to slidably receive spokes 194. The wedges 196 on spokes 194 are slidably mounted in grooves 197 formed on the inside of walls 160 of plunger 152. Thus, retractable element 178 can slide with respect to both the skirt 166 and the plunger 152.

With this configuration, springs can be placed in direct opposition around spokes 194 of retractable element 178.

Specifically, a spiral spring 199 (a resilient means) is mounted between spokes 194 and the concave underside of plunger 152, while an opposing spiral spring 198 (an extension means) is mounted between spokes 194 and the floor 168 of skirt 166.

Accordingly, in the neutral position illustrated in FIG. 19, spring 199, which is stronger than spring 198, causes retractable element 178 to extend to the illustrated position, wherein wedge 196 reaches the bottom of groove 197. In this position cutter 156 is fully sheathed by retractable element 178. The combination though of plunger 152 and retractable element 178 is kept elevated by spring 198, which pushes wedge 162 to the top of groove 176.

Figure 21:
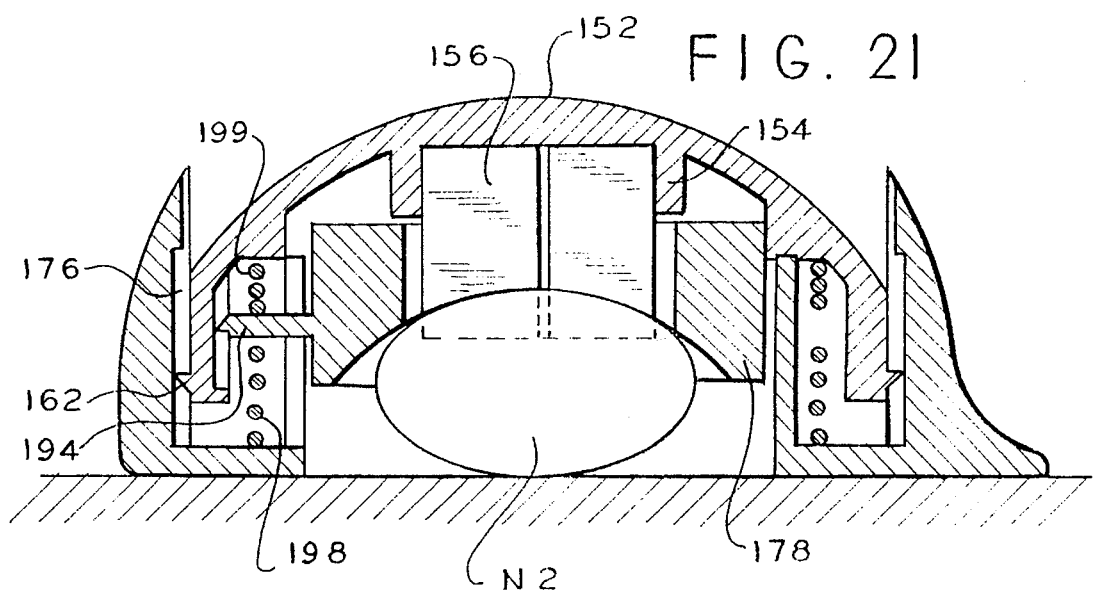
FIG. 21 is an axial sectional view of the device of FIG. 19 shown piercing a smaller nut.

In operation, plunger 152 may be depressed as shown in FIG. 21, which shows the operation with a relatively small nut N2. As illustrated, plunger 152 is depressed about two-thirds, so that wedge 162 descends about two-thirds of the way along groove 176. This causes a penetration by cutter 156 to a limited depth. The depth is limited when cruciform socket 154 of plunger 152 abuts the top of retractable element 178. Since element 178 has an elevation that is limited by nut N2, the descent of plunger 152 is likewise limited.

When plunger 152 is released, the device returns to the position illustrated in FIG. 19. Specifically, retractable element 178 is extended by spring 199, which again sheaths cutter 156 and pushes the nut off the cutter.

It is to be appreciated that various modifications may be implemented with respect to the above described preferred embodiments. While tongue and groove joints are typically shown, other embodiments may employ smoothly mating cylindrical surfaces with stops of various types for holding the cup-shaped member and retractable element together. While crossed blades are shown as a cutter, in other embodiments single blades or blades of other shapes can be used instead. Also while a retractable element having a disc-like or cylindrical shape is illustrated, in other embodiments a rectangular or other shape may be used instead. Moreover, the various components can be formed of plastic, metal, ceramics, or other appropriate materials depending upon the desired strength, rigidity, etc. While helical springs are illustrated, in other embodiments elastomeric devices, or other types of devices may provide the urging force. Furthermore, the various dimensions can be altered depending upon the expected size of the nut, the desired weight, strength, etc.

Obviously, many modifications and variations of the present invention are possible in light of the above teachings. It is therefore to be understood that within the scope of the appended claims, the invention may be practiced otherwise than as specifically described.

I claim:

1. A device for piercing a nut, comprising:
   a cup-shaped member having a manually engageable, convex surface and a concave underside;
   a cutter mounted on said concave underside of said member and pointing along a thrust direction; and
   a retractable element mounted adjacent to said cutter to reciprocate along said thrust direction, said retractable element being operable to retract relative to said member to expose and give said cutter clearance for piercing said nut, said retractable element having an indented underside facing in said thrust direction for engaging and holding in place said nut.

2. A device according to claim 1 wherein said cup-shaped member is about a handbreadth in breadth.

3. A device according to claim 1 wherein said cup-shaped member is domed.

4. A device according to claim 3 wherein said cup-shaped member has a round rim with a pointed stub projecting radially from said rim.

5. A device according to claim 4 wherein said cup-shaped member has an approximately hemispherical exterior.

6. A device according to claim 1 wherein said cutter is mounted in said cup-shaped member coaxially.

7. A device according to claim 1 wherein said retractable element has an engagement surface facing outwardly in said thrust direction for engaging said nut, said device including:
   resilient means for outwardly urging said retractable element in said thrust direction to dislodge said nut from said cutter, absent a countervailing force.

8. A device according to claim 1 wherein said resilient means comprises a spiral spring encircling said cutter.

9. A device according to claim 8 wherein said spiral spring, said cutter and said retractable element are mounted coaxially in said cup-shaped member.

10. A device according to claim 1 wherein said retractable element has an annular groove facing said cup-shaped member for receiving said spiral spring.

11. A device according to claim 1 wherein said retractable element and said cup-shaped member are slidably connected with a tongue and groove joint.

12. A device according to claim 11 wherein said cup-shaped member has (a) an internal groove acting as part of said tongue and groove joint, and (b) a graded slot acting as a rampway to said internal groove.

13. A device according to claim 7 wherein said concave underside of said cup-shaped member has a round rim, said engagement surface of said retractable element remaining approximately no further from said manually engageable surface than said round rim.

14. A device according to claim 7 wherein said retractable member has substantially a cylindrical periphery and is mounted inside said cup-shaped member.

15. A device according to claim 14 wherein said engagement surface of said retractable element is bowled, said retractable element having a channel through which said cutter is mounted to reciprocate.

16. A device according to claim 1 wherein said retractable element comprises a domed and perforated partition mounted under said concave underside of said cup-shaped member.

17. A device according to claim 16 wherein said cup-shaped member is nested inside said retractable element.

18. A device according to claim 16 wherein said retractable element has an annular wall encircling said partition.

19. A device according to claim 16 wherein said retractable element and said cup-shaped member are slidably connected with a tongue and groove joint.

20. A device according to claim 1 wherein said cup-shaped member comprises:
   a plunger; and
   an annular skirt retractably mounted around said plunger.

21. A device according to claim 20 wherein said retractable element is retractably mounted at least partially inside said plunger.

22. A device according to claim 21 wherein said cup-shaped member comprises:
   extension means for urging said skirt to extend.

23. A device according to claim 22 wherein said retractable element has an engagement surface facing outwardly in said thrust direction for engaging said nut, said device including:

resilient means for outwardly urging said retractable element in said thrust direction to dislodge said nut from said cutter, absent a countervailing force.

24. A device according to claim 22 wherein said skirt comprises:

an annular channel having an outside annular wall and an inside annular wall.

25. A device according to claim 22 wherein said skirt comprises:

an annular channel having an outside annular wall and an inside annular wall, said retractable element being slidably mounted within said inside annular wall.

26. A device according to claim 25 wherein said inside annular wall has a plurality of circumferentially spaced notches, said retractable element having a plurality of circumferentially spaced splines positioned to fit in said notches.

27. A device according to claim 26 wherein said cup-shaped member and said splines on said retractable element are slidably connected with a tongue and groove joint.

28. A device according to claim 26 wherein said plunger and said splines on said retractable element are slidably connected with a tongue and groove joint.

29. A device according to claim 22 wherein said retractable element has an engagement surface facing outwardly in said thrust direction for engaging said nut, said device including:

resilient means mounted between said plunger and said retractable element for outwardly urging said retractable element in said thrust direction to dislodge said nut from said cutter, absent a countervailing force, said extension means being mounted between said plunger and said skirt.

30. A device according to claim 25 wherein said inside annular wall has a plurality of circumferentially spaced notches, said retractable element having a plurality of circumferentially spaced spokes positioned to fit in said notches.

31. A device according to claim 30 wherein said plunger and said spokes on said retractable element are slidably connected with a tongue and groove joint.

32. A device according to claim 25 wherein said retractable element has an engagement surface facing outwardly in said thrust direction for engaging said nut, said device including:

resilient means mounted between said plunger and said retractable element for outwardly urging said retractable element in said thrust direction to dislodge said nut from said cutter, absent a countervailing force, said extension means being mounted between said retractable element and said skirt.

33. A device according to claim 32 wherein said resilient means is stronger than said extension means, so that absent countervailing forces, said retractable element remains extended, overcoming said extension means.

34. A device according to claim 33 wherein said inside annular wall has a plurality of circumferentially spaced notches, said retractable element having a plurality of circumferentially spaced spokes positioned to fit in said notches, said spokes on said retractable element being slidably connected with a tongue and groove joint.

35. A device according to claim 7 wherein said cutter is positioned to engage said nut along said thrust direction, said retractable element being positioned to engage said nut along said thrust direction, said cutter having its depth of penetration limited by said retractable element.

36. A device according to claim 35 wherein said retractable element is operable to retract and progressively expose said cutter until said retractable element contacts said cup-shaped member.

37. A method device for piercing a nut, with a cup-shaped member containing a cutter and a retractable element, comprising the steps of:

placing said retractable element over said nut with said cup-shaped member over said element;

thrusting said cup-shaped member down to pierce said nut with said cutter; and releasing said cup-shaped member and moving said retractable element relative to said cup-shaped member to cause said cup-shaped member to push said nut off said cutter.

38. A method according to claim 37 wherein the step of thrusting said cup-shaped member is performed while retracting said retractable member to expose said cutter.

39. A method according to claim 38 wherein the step of thrusting said cup-shaped member is performed until said retractable element retracts into abutment with said cup-shaped member.

40. A method according to claim 38 wherein said cup-shaped member has a plunger slidably mounted in an annular skirt, and wherein the step of thrusting said cup-shaped member is performed until said plunger abuts said annular skirt.

* * * * *